United States Patent [19]

Potsch

[11] Patent Number: 4,991,864
[45] Date of Patent: Feb. 12, 1991

[54] FORCE ABSORBER FOR A TOW VEHICLE-TRAILER CONNECTION

[76] Inventor: George Potsch, R.R. #1, Box 24, Goodland, Ind. 47948

[21] Appl. No.: 318,820

[22] Filed: Mar. 3, 1989

[51] Int. Cl.$^5$ .............................................. B62D 53/06
[52] U.S. Cl. ...................................... 280/441; 280/484
[58] Field of Search .................. 280/438.1, 439, 441.1, 280/417.1, 425.2, 483, 484, 486, 487

[56] References Cited

U.S. PATENT DOCUMENTS

| | | | |
|---|---|---|---|
| 1,136,176 | 4/1915 | Shadbolt | 280/484 |
| 1,288,425 | 12/1918 | Keesler | 280/484 |
| 1,396,500 | 11/1921 | Bement | 280/484 |
| 2,093,761 | 9/1937 | Kramer | 280/484 |
| 2,196,537 | 4/1940 | Sherman | 280/484 |
| 2,783,039 | 2/1957 | Wilson | 280/484 |
| 3,297,340 | 1/1967 | Rendessy | 280/484 |
| 3,904,226 | 9/1975 | Smalley | 280/486 |
| 4,027,893 | 6/1977 | Drudge | 280/487 |
| 4,265,465 | 5/1981 | Deitrich, Sr. | 280/484 |
| 4,327,934 | 5/1982 | Karnes | 280/438.1 |

OTHER PUBLICATIONS

Photograph entitled "Fifth-Wheel Cross Bar Hitch Mounting Bracket".

Primary Examiner—Mitchell J. Hill

[57] ABSTRACT

A device for absorbing forces between a tow vehicle and a trailer, such as a fifth wheel, is disclosed. Preferably, the device is mountable in a pick-up truck bed with a cross bar between two force absorbers having biasing precompressed springs to absorb forces such as from jolts and offset forces of the road due to bumps, wind, and other forces. The cross bar may be readily removed to expose the pick-up bed. The force absorbers may include a shaft having a slide body with the springs to resist movement of the slide body along the shaft. The slide body is couplable to the trailer, typically via the cross bar. A mechanism is provided to allow the slide body mounted to the cross bar to pivot to allow pivoting of the cross member between said the first and second force absorbers and so that binding on the shaft is reduces as the cross bar pivots and shifts. The shaft may be disposed in a longitudinal opening in the slide body having a tapered portion, such as a venturi shaped hole, to reduce binding. A bronze bushing and a bronze pressure wear plate may be provided to reduce spalling and enhance sliding between the members. The wear plate may be removable and interchangeable when it wears out. Grease fittings may be further provided.

35 Claims, 4 Drawing Sheets

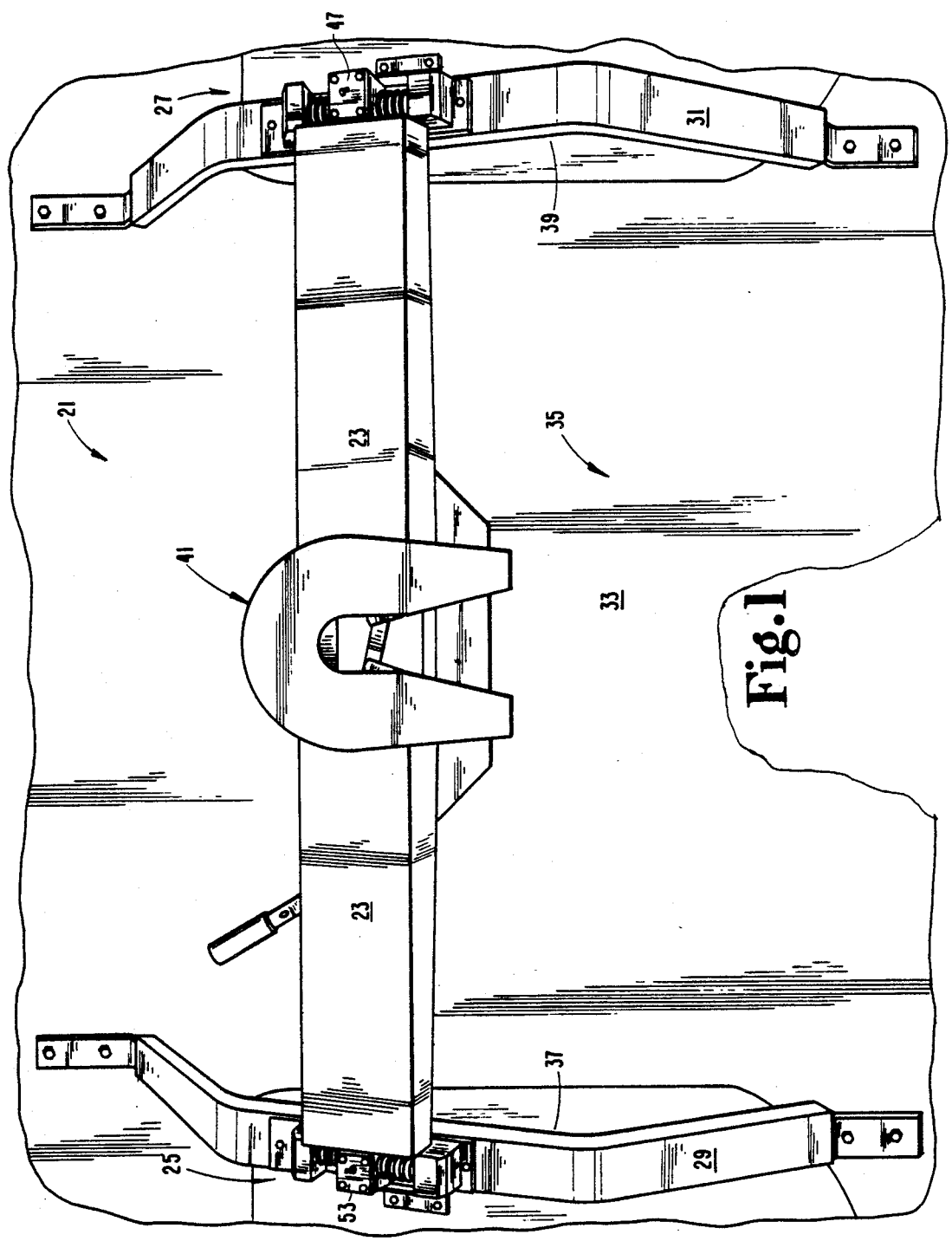

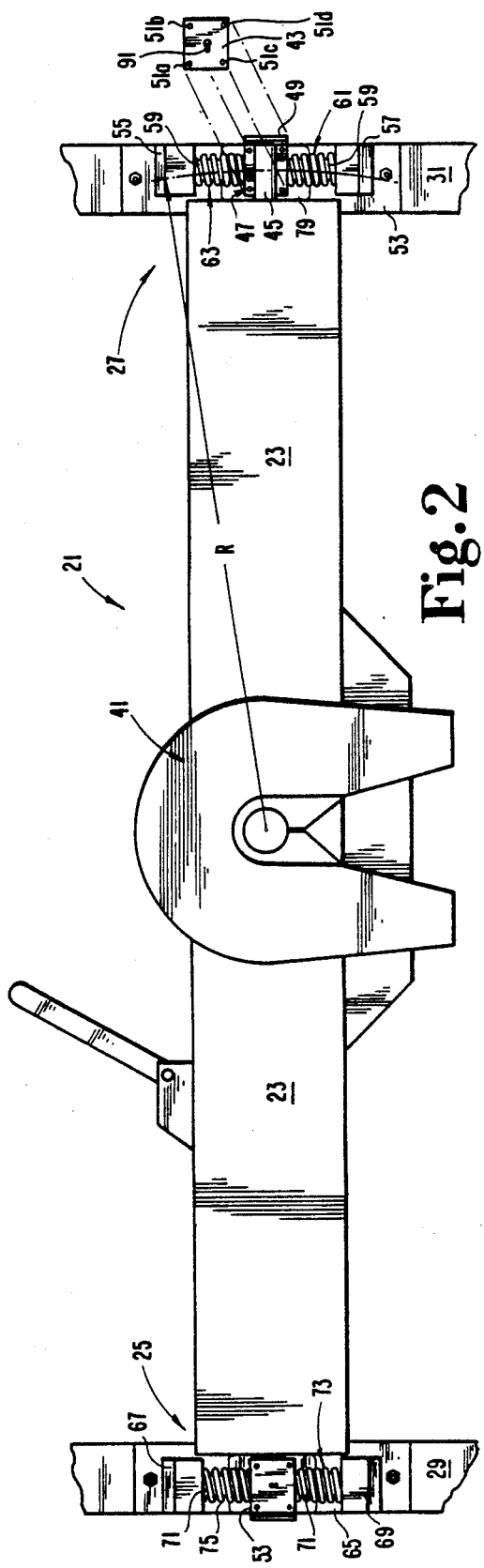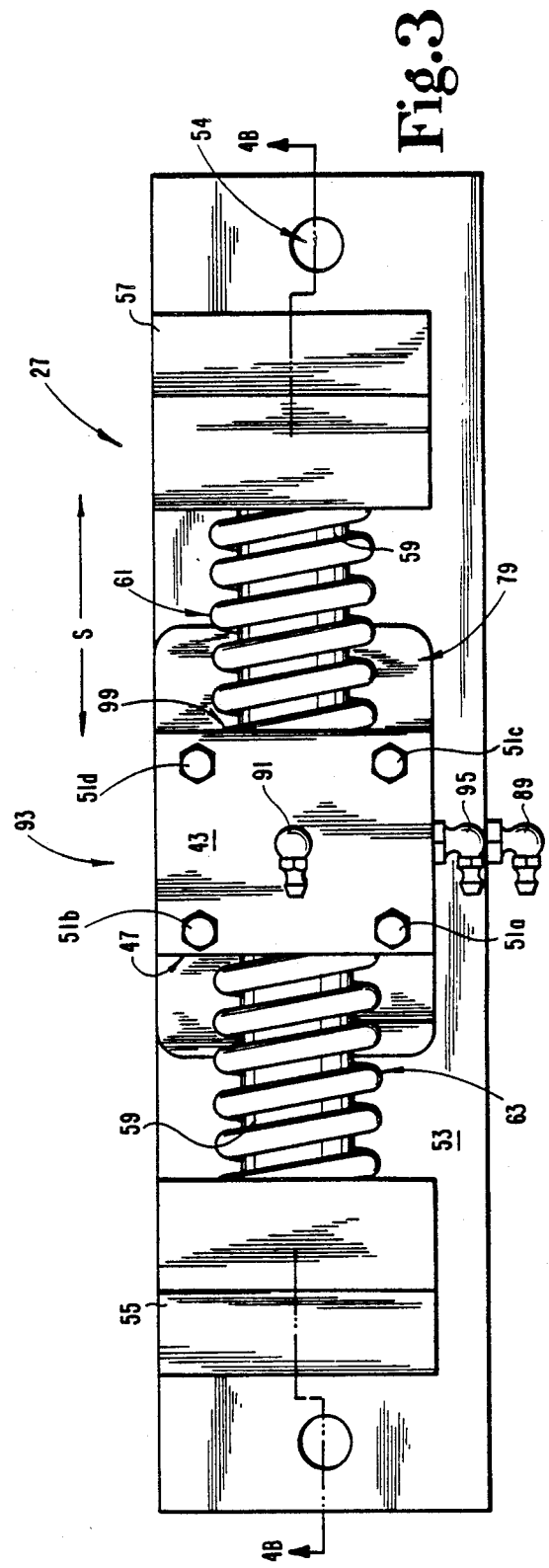

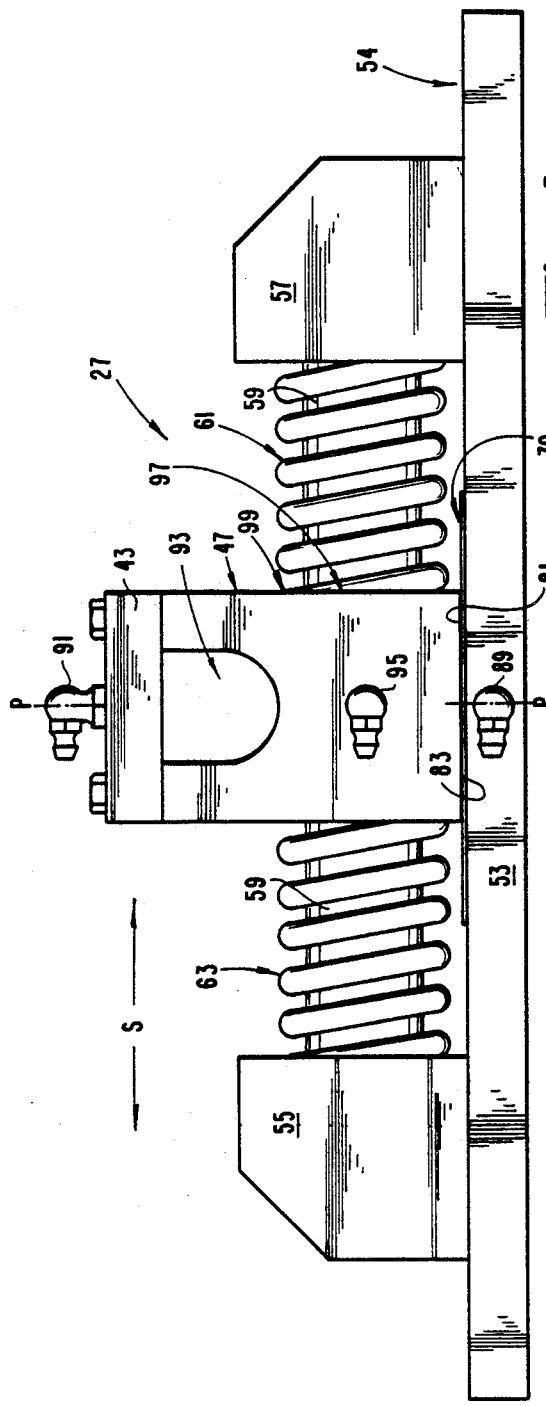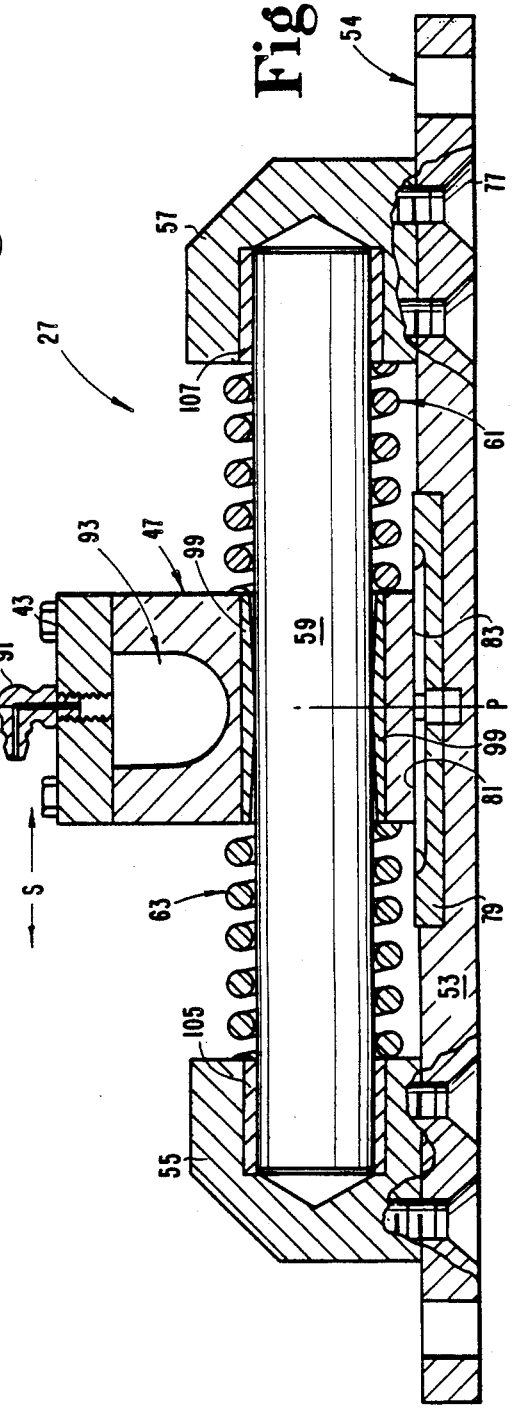

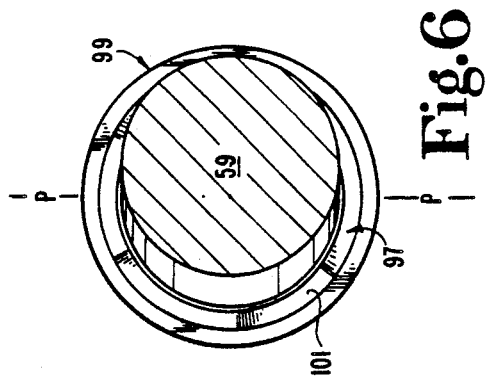
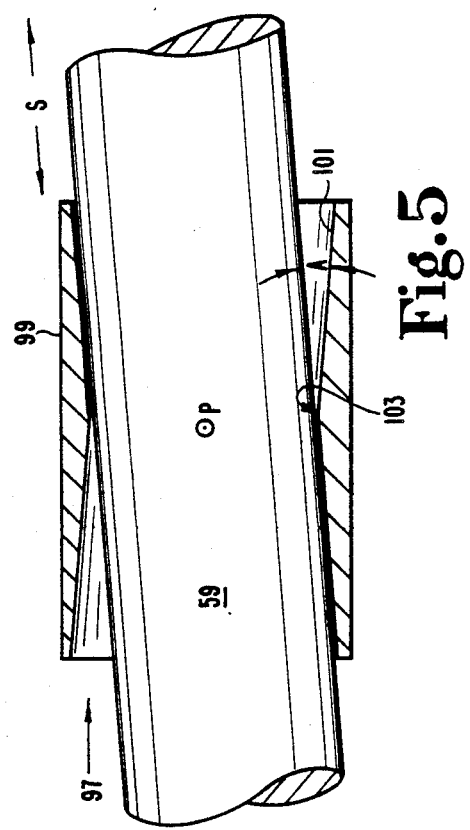
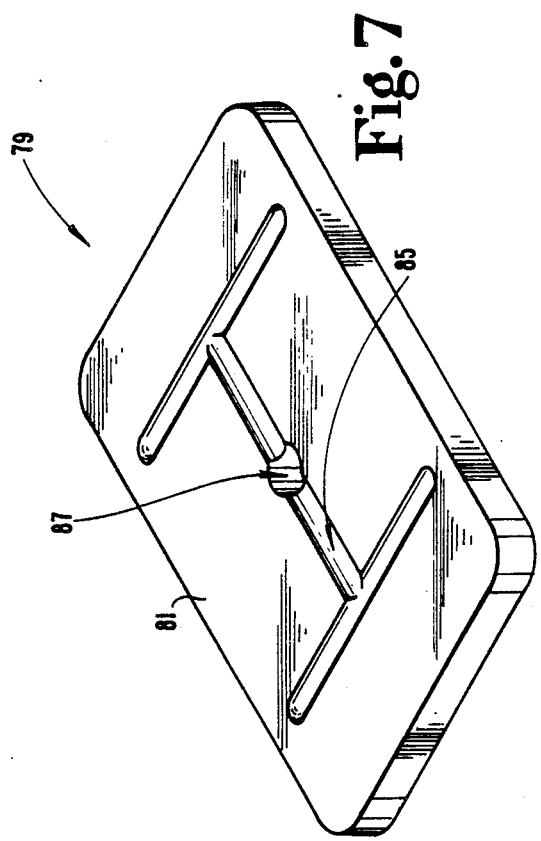

FORCE ABSORBER FOR A TOW VEHICLE-TRAILER CONNECTION

BACKGROUND OF THE INVENTION

The present invention relates generally to connections or hitches between a tow vehicle such as a pick-up truck and a trailer, and more specifically to a force absorber for such connections, especially suitable for fifth wheels.

Prior hitches between pick-up trucks commercially marketed are rigid in that they do not absorb forces between the two vehicle and the trailer, but instead transmit such forces. The result can lead to driver fatigue, and over an extended period, premature mechanical failure in the truck. Such commercial hitches have a pair of mounts above the wheel wells with a readily removable cross bar running between them with the hitch in the center of the cross bar.

The present invention provides force absorbing, resulting in a much smoother ride. However, in force absorbers of this kind, serious binding problems may occur in the mechanism. The binding can eliminate or at least substantially reduce the effectiveness of the force absorbing characteristics, rendering the device unsatisfactory.

Several patents show force absorbing mechanisms using various spring arrangements or elastomerics for use between tow vehicles and trailers. However, the binding problem has not been addressed as in the present invention. Furthermore, such systems apparently fail to have a force absorbing mechanism in combination with a readily removable cross bar in a pick-up truck for use with a fifth wheel hitched in the center of the bar according to the present invention.

U.S. Pat. No. 1,136,176 shows a double spring configuration suitable for a tractor. U.S. Pat. No. 2,093,761 shows a fifth wheel hitch with springs mounted to a truck chassis. U.S. Pat. No. 3,904,226, 4,027,893 show force absorbing hitches on rear bumpers of pick-up trucks. Other systems are disclosed in U.S. Pat. Nos. 1,288,425, 1,396,500, 2,196,537, 2,783,039, and 3,297,340. None of these teach the present invention. The present invention may include a mechanism to allow pivoting such as a tapered portion between a slide body and a shaft to reduce binding. Furthermore, material such as bronze may be used next to steel to reduce binding and galling. The present invention provides the convenience of a ready-removal cross bar to expose the pick-up truck bed while still providing force absorbing with a relatively simple design. Springs under precompression are preferably used to prevent play or unwanted sliding in the slide body. A replaceable bronze wear plate may be used and replaced without needing to replace the entire device. These and other features set forth in more detail below provide a significant advance in the art.

SUMMARY OF THE INVENTION

According to one embodiment, the present invention provides a device for absorbing forces between a two vehicle and a trailer, comprising: first means for absorbing force mountable to the tow vehicle; second means for absorbing force mountable to the tow vehicle; a transverse cross member coupled to the first and second means for absorbing force and having means for coupling to the trailer disposed between the first and second means for absorbing force, wherein the first means for absorbing force includes: a guide member oriented in a slide direction generally along the direction of travel of the two vehicle; a means for mounting the guide member to the tow vehicle; a slide body having means for coupling to the cross member and longitudinally slidable along the guide member, wherein the slide body has means for pivoting the means for coupling to the cross member with respect to the guide member on a pivot axis oriented generally vertically with respect to the slide direction of the guide member to to allow pivoting of the cross member between the first and second means for absorbing force; and biasing means for resiliently biasing against movement of the slide body along the guide member.

According to another embodiment, the present invention provides a device for a tow vehicle-trailer connection, comprising a means for absorbing force mountable between the tow vehicle and the tailer, wherein the means for absorbing force includes: means for mountable to the tow vehicle; a guide member mounted to the means for mounting and oriented in a slide direction generally along the direction of travel of the tow vehicle; a slide body having means for coupling to the cross member and longitudinally slidable along the guide member, wherein the slide body has a longitudinal opening therethrough with the guide member being disposed in the longitudinal opening, the longitudinal opening having a tapered portion tapering inwardly towards the guide member along the slide direction allowing the slide body to pivot on a pivot axis oriented generally vertically with respect to the slide direction of the guide member to reduce binding between the guide member and the slide body; and biasing means for resiliently biasing against movement of the slide body along the guide member; and a means for coupling the slide body to the trailer to be towed by the tow vehicle.

According to another embodiment, the present invention provides a device for a tow vehicle-trailer connection, comprising a means for absorbing force mountable to the tow vehicle, wherein the means for absorbing force includes; means for mountable to the tow vehicle; a guide member mounted to the means for mounting and oriented in a side direction generally along the direction of travel of the tow vehicle; a slide body longitudinally slidable along the guide member, wherein the slide body has a longitudinal opening therethrough with the guide member being disposed in the longitudinal opening; a pressure wear plate located beneath the slide body and disposed between the means for mounting and the slide body, wherein the pressure wear plate is made of a material having a top surface hardness different than a bottom surface hardness of the slide body to enhance sliding and to reduce galling between the pressure wear plate and the slide body; and biasing means for resiliently biasing against movement of the slide body along the guide member; and means for coupling the slide body to the trail to be towed by the tow vehicle;

According to another embodiment, the present invention provides a device for absorbing forces between a trailer and a pick-up truck having a cargo bed with two laterally disposed wheel well housings projecting above the bed, comprising a first means for mounting being mounted above a top side of a first of the two wheel well housings; second means for mounting being mounted above a top side of a second of the two wheel well housings; a transverse cross member spanning between the two wheel well housings above the cargo bed and coupled to the first and second means for mounting and having means for coupling to the trailer disposed between the first and second means for mounting, the first means for mounting including first means for ready-removal of the transverse cross member and the second means for mounting including second means for ready-removal of the transverse cross member to expose the cargo bed for cargo storage upon removal of the transverse cross member, the transverse cross member coupled to associated means for absorbing force between the trailer and the pick-up truck, the means for absorbing force including at least one guide member and a body member slidable with respect to each other and further including biasing means for resiliently biasing against movement between the body member and the guide member.

According to another embodiment, the present invention provides a device for a tow vehicle-trailer connection, comprising a means for absorbing force mountable to the tow vehicle, wherein the means for absorbing force includes: means for mountable to the tow vehicle; a guide member mounted to the means for mounting and oriented in a slide direction generally along the direction of travel of the tow vehicle, the guide member having a steel outer surface; a slide body having means for coupling to the cross member to the trailer and longitudinally slidable along the guide member, wherein the slide body has a longitudinal opening therethrough with the guide member being disposed in the longitudinal opening, wherein the longitudinal opening is lined with bronze metal to enhance sliding and to reduce galling between the slide body and the guide member; and biasing means for resiliently biasing against movement of the slide body along the guide member; and means for coupling the slide body to the trailer to be towed by the tow vehicle.

An object of the present invention is to provide an improved force absorber for a tow vehicle-trailer connection.

Another object of the present invention is to reduce driver fatigue and mechanical failure when towing trailers such as fifth wheels.

Another object of the present invention is to provide the convenience of a ready-removal cross bar rig in a pick-up truck with a force absorbing mechanism.

Another object of the present invention is to reduce binding and to reduce galling in a force absorber device for a tow vehicle-trailer connection.

These and other objects and advantages of the present invention will be apparent from the following specification and the drawings.

BRIEF DESCRIPTION OF THE DRAWINGS

FIG. 1 is a top perspective view of one embodiments of the present invention mounted to a pickup truck.

FIG. 2 is a top plan view of the present invention.

FIG. 3 is a top plan view of a force absorber device of the present invention.

FIG. 4A is a side elevational view of the device of FIG. 3.

FIG. 4B is a side elevational sectional view of the device of FIG. 3 taken along line 4B—4B in FIG. 3.

FIG. 5 is an enlarged detailed top plan view of a bushing and a guide member which may be used in the present invention, the bushing being shown in section.

FIG. 6 is an enlarged detailed front view of a bushing and a guide member which may be used in the present invention, the guide member being shown in cross-section.

FIG. 7 is a top perspective view of a pressure wear plate which may be used in the present invention.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless by understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 1–7, like reference numbers denote like elements. FIGS. 1 and 2 show a completed assembly of a preferred embodiment of the present invention, whereas FIGS. 3–7 show various component parts of the present invention's preferred embodiment.

FIGS. 1 and 2 show a force absorber for a tow vehicle-trailer connection 21 according to the present invention. Cross bar 23 is supported by force absorber 25 on the left side and force absorber 27 on the right side. In the preferred embodiment, force absorber 25 and force absorber 27 are similarly constructed, and will be described further below. Force absorber 25 is mounted to bracket 29 by bolts as shown, or may be welded or otherwise fastened or integrally formed. Force absorber 27 is similarly mounted to bracket 31. As illustrated in FIG. 1, brackets 29 and 31 are bolted to cargo bed 33 of pickup truck 35. Preferably, the present invention is used in a conventional pickup truck with force absorber 25 being mounted above the top side of left wheel well housing 37, and similarly force absorber 27 is preferably mounted above the top side of right wheel well housing 39. In this way, the smooth ride provided by the force absorber mechanisms of the present invention may be utilized with a popular pickup truck while having the advantage of a readily removable cross bar 23 to expose cargo bed 33 for cargo storage. When the present invention is not being utilized to tow a trailer such as a fifth wheel (not shown), the operator need only remove the cross bar without having to disassemble the entire bracket and load absorber mechanisms to take advantage of the storage capacity of cargo bed 33. Note that cross bar 23, as illustrated, has a horseshoe-shaped hitch mechanism 41 centrally located therein, transversely between the wheel wells and transversely between force absorber 25 and force absorber 27 as is known. Cross bar 23 with hitch mechanism 41, along with brackets 29 and 31, are prior art standing along from the other features of the present invention, and are commercially available and may be provided along with the sale of some fifth wheels.

In FIG. 1, on the right side, coupler plate 43 is shown in an exploded, removed position from the remainder of force absorber 27 for drawing clarity. Accordingly, coupler rod 45, which is part of cross bar 23, is shown nested down into a receiving opening of slide body 47. Coupler rod 45 has lateral washer 49 welded to it so that when coupler plate 43 is screwed down into the remainder of slide body 47, cross bar 23 and force absorber 27 are securely coupled together. In the preferred embodiment, coupler plate 43 secured to slide body 47 by four vertically oriented threaded bolts 51a, 51b, 51c and 51d screwed into corresponding holes as shown in slide body 47. The left end of cross bar 23 is securely coupled to load absorber 25 in a similar fashion using a coupler plate and four vertical bolts to hold a left coupler rod and lateral washer of the cross bar to slide body 53 of force absorber 25. In this way, cross bar 23 may be readily removed from the load absorbers by unbolting eight easy-to-access bolts and removing the coupler plates, allowing the coupler rods of cross bar 23 to be lifted vertically out. Thus, cargo bed 33 of the pickup truck is exposed for use. Other coupling mechanism may be used according to design, but preferably should be readily removable such as by unscrewing, a removal of cotter pins, unsnapping or the like.

In the preferred embodiment, force absorber 27 includes base plate 53, end cap 55 and end cap 57, slide body 47, spring 61 and spring 63, and a guide member shown as shaft 59.

Force absorber 25 is similarly constructed with base plate 65, end cap 67 and end cap 69, spring 73 and spring 75, and a guide member shown as shaft 71. Further details of load absorber 27 are described below, it being understood that load absorber 25 is preferably of a similar construction.

Referring now to FIGS. 3, 4A and 4B, load absorber 27 is shown. Base plate 53, end cap 55 and end cap 57 collectively provide a mechanism in the preferred embodiment for mounting shaft 59 to the tow vehicle. Base plate 53 may be mounted to bracket 31 with bolts through bolt holes, such as bolt hole 54 (see FIGS. 3, 4A and 4B). As illustrated in FIG. 4B (partially cut away), end caps 55 and 57 are mounted to base plate 53 by vertically disposed screws, such as screw 77. Other mechanisms may be used such as a tongue-in-groove or a dovetail structure as well. Preferably, at least one of the end caps is removable from base plate 53 to facilitate replaceability of pressure wear plate 79. Pressure wear plate is located beneath slide body 47 and is disposed between base plate 53 and slide body 47. Plate 79 is thus positioned to bear the vertically downward force due to the weight of the trailer as transmitted through cross bar 23 and slide body 47. Preferably pressure wear plate 79 is made of bronze Ampco metal, whereas slide body 47 and base plate 53 are preferably made of steel. Accordingly, pressure wear plate 79 has a top surface 81 having a hardness different than a hardness of bottom surface 83 of slide body 47 (see FIGS. 4A and 4B). In this way, better sliding movement of slide body 47 (see "S") is provided with less, or better described as galling, spalling between the top surface 81 and bottom surface 83.

Referring to FIG. 7, pressure wear plate 79 is shown removed from the rest of the embodiment and having top surface 81. Furthermore, one or more grooves, such as groove 85 may be provided to help distribute lubricating grease between surface 81 and surface 83. Grease may be provided through grease aperture 87 in pressure wear plate 79. Grease is provided to grease aperture 87 through a standard grease fitting 89 (see FIGS. 3 and 4A) which includes a transverse hole (not shown) through base plate 53 to grease aperture 87. A similar grease fitting 91 is provided on top of coupler plate 43 with a vertically disposed bore (see FIG. 4B) to provide lubrication to opening 93 in slide body 47. Opening 93 receives coupled rod 45 (see FIG. 2) and the grease from grease fitting 91 lubricates this coupling. Also, grease fitting 95 is provided on the side of the body 47 (see FIGS. 3 and 4A). Grease fitting 95 provides grease in longitudinal opening 97 disposed longitudinally through slide body 47. Shaft 59 is located in longitudinal opening 97, and grease from grease fitting 95 may provide lubrication therebetween.

It is advantageous to have pressure wear plate 79 separately formed from base plate 53 and interchangeably replaceable therein. After extended use when pressure wear plate 79 is worn out, it may be replaced without needing to replace the entire base plate 53. Furthermore, its replaceability is useful in that it allows a harder metal, such as bronze to be used. This is advantageous in that a more ductile metal may be used for base plate 53, reducing the likelihood of fatigue and failure of base plate 53. Harder metal, such as nickel alloys, are advantageous in that they reduce galling, but tend to be harder and more brittle, and accordingly are subject to more fatigue and cracked propagation.

Referring to FIGS. 5 and 6, in the preferred embodiment, longitudinal opening 97 is defined by bushing 99 mounted in slide body 47. Preferably, bushing 99 is made of bronze Ampco material similar to pressure wear plate 79. Accordingly, when shaft 59 is made of a material having a different outer surface hardness, such as steel, galling is reduced between the bushing and the shaft, providing better slidably along direction S. Bushing 99, and accordingly longitudinal opening 97, include a tapered portion 101 (see FIGS. 5 and 6A). As illustrated in FIGS. 4B, 5 and 6, bushing 99 preferably has an internal geometry in which longitudinal opening 97 is formed by a pair of co-axial, oppositely disposed frustoconical bores forming a venturi-shaped hole. These tapers neck down to a constricted region 103 towards the middle of busing 99. In the preferred embodiment, the steel shaft is round in cross-section with a one-inch outside diameter, whereas bushing 99 at constricted region 103 has an inside diameter slightly larger than shaft 59, it being found that a 0.018 inch larger diameter provides suitable additional room for a one inch diameter shaft 59 to pivot about pivot axis P (see FIGS. 4A, 4B, 5 and 6). However, the guide member may be a structure other than a shaft and opening and may have other, non-circular shapes, such as a tongue-in-groove structure, a confining wall structure, or track structure with the other features of the present invention. Optionally, as illustrated in FIG. 3B, bushing 105 and busing 107 may be removably disposed in the end caps. By removing these bushings, a larger shaft and springs may be used. Tapered portion 101 may be a variety of tapers, but it has been found in the preferred embodiment that a taper of about four and a half degrees (4°30') with respect to an axial direction is preferred. Accordingly, referring in FIG. 5, Angle A is twice that taper, or about nine degrees (9°) between the outer surface of shaft 59 when the shaft is in its extreme pivoted position around pivot axis P as illustrated in FIG. 5. Radial shifting of cross bar 23 is provided by the slight oversizing of constricted region 103 (see FIG. 5) and lateral play between lateral washer 49 and coupler plate 43 (see FIG. 2).

Slide body 47 and coupler plate 43 pivot with respect to guide member 59. Pivot axis P is oriented generally perpendicularly and vertically with respect to the slide direction S of guide member 59. Although shown intersecting with the shaft axis along side direction S, pivot axis P may alternatively be skew with the shaft axis. Such pivot action reduces binding between guide member 59 and slide body 47 as slide body 47 slides forwardly and backwardly along guide member 59. Without such pivot action, when cross bar 23 pivots with respect to the tow vehicle along radius R (see FIG. 2), binding occurs between slide body 47 and shaft 59. The present invention advantageously provides movement of the pair of force absorbers with respect to each other, allowing cross bar 23 to pivot. However, the pivot action provided by the present invention substantially eliminates such binding, particularly when the bronze bushing is used. Although the preferred embodiment uses the venturi shaped bushing as previously described, other such pivot mechanisms may be used such as a rotable pivot mount between slide body 47 and the mechanism used to mount coupled rod 45 to the slide body. Note that pivoting of cross bar 23 about radius R is especially prevalent when the tow vehicle enters a turn with the trailer behind it. Accordingly, the present invention reduces binding, maintaining operability of the force absorbing characteristics during a full range of motion.

In the preferred embodiment, springs, such as spring 61 and spring 63 provide resilient biasing against movement of slide body 47 along shaft 59 in slide direction S, both forwardly and backwardly. As illustrated, the preferred embodiment utilizes a pair of helical springs 61 and 63 with slide body 47 therebetween. Preferably, each of these springs are helically disposed around shaft 59. Furthermore, these springs are preferably precompressed somewhat between their respective end cap 57 and end cap 55, and slide body 47. Such precompression is preferred to having the springs entirely relaxed since precompression eliminates play or looseness of slide member 47, and provides instantaneous resilient biasing upon movement of slide body 47. In the preferred embodiment, springs, such as spring 61 and spring 63 may be of different size depending on load conditions. Springs for weight class up to 7,000 pounds have a collapsing pressure at 37% or 634 pounds and should be preset or precompressed at 1/16th inch with a pressure of 56 pounds. Due to the presence of two load absorbers, load absorber 25 and load absorber 27, this provides a total compression of 1,268 pounds. Weight classes up to 11,000 pounds have a collapsing pressure at 30% or 950 pounds and should be preset or precompressed at 120 pounds. With a dual load absorber configuration, this provides a total of 1,900 pounds compression. The present invention may be utilized with other biasing mechanisms, such as tension springs and/or elastomerics, leaf springs, or other such mechanisms according to design.

While the invention has been illustrated and described in detail in the drawings and foregoing description, the same is to be considered as illustrative and not restrictive in characters, it being understood that only the preferred embodiment has been shown and described and that all changes and modifications that come within the spirit of the invention are desired to be protected.

What is claimed is:

1. A device for absorbing forces between a tow vehicle and a trailer, comprising:
   first means for absorbing force mountable to the tow vehicle;
   second means for allowing force mountable to the tow vehicle;
   a transverse cross member coupled to said first and second means for absorbing forces and having means for coupling said cross member to the trailer disposed between said first and second means for absorbing forces, wherein said first means for absorbing force includes:
   (a) a guide member oriented in a slide direction generally along the direction of travel of the tow vehicle;
   (b) means for mounting said guide member to the tow vehicle;
   (c) a slide body having means for coupling to said cross member and longitudinally slidable along said guide member, said slide body has means for pivoting said means for coupling to said cross member with respect to said guide member on a pivot axis oriented generally vertically with respect to said slide direction of said guide member to allow pivoting of said cross member between said first and second means for absorbing force; and
   (d) biasing means for resiliently biasing against movement of said slide body along said guide member.

2. The device of claim 1 wherein said means for pivoting comprises a longitudinal opening through said slide body with said guide member being disposed in said longitudinal opening, said longitudinal opening having a tapered portion tapering inwardly towards and guide member along said slide direction of said guide member.

3. The device of claim 2 wherein said tapered portion of said longitudinal opening is defined by a bushing member mounted in said slide body, and wherein said bushing member is a material having a surface hardness different than a surface hardness of said guide member to enhance sliding and to reduce galling between said bushing member and said guide member.

4. The device of claim 3 and further comprising a pressure wear plate located beneath said slide body and disposed between said means for mounting and said slide body, wherein said pressure wear plate is a material having a top surface hardness different than a bottom surface hardness of said slide body to enhance sliding and to reduce galling between said pressure wear plate and said slide body.

5. The device of claim 4 werein said longitudinal opening in said slide body is formed by a pair of coaxial, oppositely disposed frustoconical bores forming a venturi shaped hole.

6. The device of claim 5 wherein said tapered portion of said longitudinal opening tapers at an angle of about nine degrees with respect to an outer surface of said guide member adjacent said tapered portion.

7. The device of claim 6 wherein said pressure wear plate is separable from said mounting means and is interchangeably replaceable in said mounting means.

8. The device of claim 7 and further comprising a lubricating grease fitting means for injecting grease between said slide body and said pressure wear plate, and wherein said pressure wear plate has at least one groove in a top surface thereof for receiving grease.

9. The device of claim 8 wherein said guide member comprises a shaft and wherein said biasing means comprises a pair of helical springs with said slide body therebetween, each of said springs being disposed around said shaft and precompressed between said means for mounting and said slide body.

10. The device of claim 9 wherein said pressure wear plate is bronze metal.

11. The device of claim 10 wherein said bushing member in said slide body is bronze metal.

12. The device of claim 11 and further comprising a lubricating grease fitting means for injecting grease into said longitudinal opening between said slide body and said guide member.

13. The device of claim 12 wherein said second mans for absorbing force includes:
   (e) a second guide member oriented in a slide direction generally along the direction of travel of the tow vehicle;
   (f) second means for mounting said second guide member to the tow vehicle;
   (g) a second slide body having second means for coupling to said cross member and longitudinally slidable along said second guide member, wherein said second slide body has second means for pivoting said second means for coupling to said cross member with respect to said second guide member on a second pivot axis oriented generally vertically with respect to said slide direction of said second guide member to allow pivoting of said cross member between said first and second means for absorbing force; and
   (h) second biasing means for resiliently biasing against movement of said second slide body along said second guide member.

14. The device of claim 1 and further comprising a pressure wear plate located beneath said slide body and disposed between said means for mounting and said slide body, wherein said pressure wear plate is a material having a top surface hardness different than a bottom surface hardness of said slide body to enhance sliding and to reduce galling between said pressure wear plate and said slide body.

15. The device of claim 2 wherein said longitudinal opening in said slide body is formed by a pair of coaxial, oppositely disposed frustoconical bores forming a venturi shaped hole.

16. The device of claim 2 wherein said tapered portion of said longitudinal opening tapers at an angle of about nine degrees with respect to an outer surface of said guide member adjacent said tapered portion.

17. The device of claim 2 and further comprising a lubricating grease fitting means for injecting grease into said longitudinal opening between said slide body and said guide member.

18. The device of claim 1 wherein said second means for absorbing force includes:
   (e) a second guide member oriented in a slide direction generally along the direction of travel of the tow vehicle;
   (f) second means for mounting said second guide member to the tow vehicle;
   (g) a second slide body having second means for coupling to said cross member and longitudinally slidable along said second guide member, wherein said second slide body has second means for pivoting said second means for coupling to said cross member with respect to said second guide member on a second pivot axis oriented generally vertically with respect to said slide direction of said second shaft member to allow pivoting of said cross member between said first and second means for absorbing force; and
   (h) second biasing means for resiliently biasing against movement of said second slide body along said second guide member.

19. The device of claim 1 wherein said guide member comprises a shaft and wherein said biasing means comprises a pair of helical springs with said slide body therebetween, each of said springs being disposed around said shaft and precompressed between said means for mounting and said slide body.

20. The device of claim 3 wherein said bushing member in said slide body is bronze metal.

21. The device of claim 14 wherein said pressure wear plate is separable from said mounting means and is interchangeably replaceable in said mounting means.

22. The device of claim 14 and further comprising a lubricating grease fitting means for injecting grease between said slide body and said pressure wear plate, and wherein said pressure wear plate has at least one groove in a top surface thereof for receiving grease.

23. The device of claim 14 wherein said pressure wear plate is bronze metal.

24. A device for a tow vehicle-trailer connection, comprising:
   means for absorbing force mountable between the tow vehicle and the trailer, wherein said means for absorbing force includes:
      (a) a guide member oriented in a slide direction generally along the direction of travel of the tow vehicle;
      (b) means for mounting said guide member to the tow vehicle;
      (c) a slide body having means for coupling to said cross member and longitudinally slidable along said guide member, said slide body has a longitudinal opening therethrough with said guide member being disposed in said longitudinal opening, said longitudinal opening having a tapered portion tapering inwardly towards and guide member along said slide direction allowing said slide body to pivot on a pivot axis oriented generally vertically with respect to said slide direction of said guide member to reduce binding between said guide member and said slide body; and
      (d) biasing means for resiliently biasing against movement of said slide body along said guide member; and
   means for coupling said slide body to the trailer to be towed by the tow vehicle.

25. The device of claim 24 wherein said tapered portion of said longitudinal opening is defined by a bushing member mounted in said slide body, and wherein said bushing member is a material having a surface hardness different than a surface hardness of said guide member to enhance sliding and to reduce galling between said bushing member and said guide member.

26. The device of claim 25 and further comprising a pressure wear plate located beneath said slide body and disposed between said means for mounting and said slide body, wherein said pressure wear plate is a material having a top surface hardness different than a bottom surface hardness of said slide body to enhance sliding and to reduce galling between said pressure wear plate and said slide body.

27. The device of claim 24 wherein said longitudinal opening in said slide body is formed by a pair of coaxial, oppositely disposed frustoconical bores forming a venturi shaped hole.

28. A device for absorbing forces between a tow vehicle and a trailer, comprising:

mans for absorbing force mountable to the tow vehicle, wherein said means for absorbing force includes:
- (a) a guide member oriented in a slide direction generally along the direction of travel of the tow vehicle;
- (b) means for mounting said guide member to the tow vehicle;
- (c) a slide body longitudinally slidable along said guide member, wherein said slide body has a longitudinal opening therethrough with said guide member being disposed in said longitudinal opening;
- (d) a pressure wear plate located beneath said slide body and disposed between said means for mounting and said body, wherein said pressure wear plate is a material having a top surface hardness different than a bottom surface hardness of said slide body to enhancing sliding and to reduce galling between said pressure wear plate and said slide body; and
- (e) biasing means for resiliently biasing against movement of said slide body along said guide member; and means for coupling said slide body to the trailer to be towed by the tow vehicle.

29. A device for absorbing forces between a tow vehicle and a trailer, comprising:

means for absorbing force mountable to the tow vehicle, wherein said means for absorbing force includes:
- (a) a guide member oriented in a slide direction generally along the direction of travel or the tow vehicle;
- (b) means for mounting said guide member to the tow vehicle;
- (c) a slide body longitudinally slidable along said guide member, wherein said slide body has a longitudinal opening therethrough with said guide member being disposed in said longitudinal opening;
- (d) a pressure wear plate located beneath said slide body and disposed between said means for mounting and said slide body, wherein said pressure wear plate is a material having a top surface hardness different than a bottom surface hardness of said slide body to enhance sliding and to reduce galling between said pressure wear plate and said slide body; and
- (e) biasing means for resiliently biasing against movement of said slide body along said guide member; and means for coupling said slide body to the trailer to be towed by the tow vehicle, wherein said pressure wear plate is separable from said mounting means and is interchangeably replaceable in said mounting means.

30. The device of claim 29 wherein said pressure wear plate is bronze metal.

31. The device of claim 29 wherein said means for mounting is steel and wherein said slide body is steel.

32. A device for absorbing forces between a tow vehicle and a trailer, comprising:

means for absorbing force mountable to the tow vehicle, wherein said means for absorbing force includes:
- (a) a guide member oriented in a slide direction generally along the direction of travel of the tow vehicle;
- (b) means for mounting said guide member to the tow vehicle;
- (c) a slide body longitudinally slidable along said guide member, wherein said slide body has a longitudinal opening therethrough with said guide member being disposed in said longitudinal opening;
- (d) a pressure wear plate located beneath said slide body and disposed between said means for mounting and said slide body, wherein said pressure wear plate is a material having a top surface hardness different than a bottom surface hardness of said slide body to enhance sliding and to reduce galling between said pressure wear plate and said slide body; and
- (e) biasing means for resiliently biasing against movement of said slide body along said guide member;
- (f) lubricating grease fitting means for injecting grease between said slide body and said pressure wear plate, wherein said pressure wear plate has at least one groove in a top surface thereof for receiving grease; and means for coupling said slide body to the trailer to be towed by the tow vehicle.

33. A device for absorbing forces between a trailer and a pick-up truck having a cargo bed with two laterally disposed wheel well housings projecting above the bed, comprising:

first means for mounting a transverse cross member to the pick-up truck being mounted above a top side of a first of the two wheel well housing;

second means mounting said transverse cross member to the pick-up truck being mounted above a top side of a second of the two wheel well housings;

wherein said transverse cross member spans between the two wheel well housings above the cargo bed and is coupled to said first and second means for mounting and has means for coupling to the trailer disposed between said first and second means for mounting, said first means for mounting including first means for ready-removal of said transverse cross member and said second means for mounting including second means for ready-removal of said transverse cross member to expose the cargo bed for cargo storage upon removal of said transverse cross member, said transverse cross member coupled to associated means for absorbing force between the trailer and the pick-up truck, said means for absorbing force including at least one guide member and a body member slidable with respect to each other and further including biasing means for resiliently biasing against movement between said body member and said guide member.

34. The device of claim 33 wherein said means for absorbing force between the trailer and the pick-up truck includes both; a left-side force absorber with a left-side body member and a left-side guide member and left-side biasing means for resiliently biasing against movement between said left-side body member and said left-side guide member above said top side of said first wheel will housing; and, a right-side force absorber with a right-side body member and a right-side guide member and right-side biasing means for resiliently biasing against movement between said right-side body member and said right-side guide member above said top side of said second wheel well housing.

35. A device for absorbing forces between a tow vehicle and a trailer, comprising:

means for absorbing force mountable to the tow vehicle, wherein said means for absorbing force includes:
  (b) a guide member oriented in a slide direction generally along the direction of travel of the tow vehicle, said guide member having a steel outer surface;
  (b) means for mounting said guide member to tow vehicle;
  (c) a slide body having means for coupling to said cross member to the trailer and longitudinally slidable along said guide member, said slide body has a longitudinal opening therethrough with said guide member being disposed in said longitudinal opening, said longitudinal opening is lined with bronze metal to enhance sliding and to reduce galling between said slide body and said guide member; and
  (d) biasing means for resiliently biasing against movement of said body along said guide member; and
  means for coupling said slide body to the trailer to be towed by the tow vehicle.

* * * * *

UNITED STATES PATENT AND TRADEMARK OFFICE
CERTIFICATE OF CORRECTION

PATENT NO. : 4,991,864

DATED : February 12, 1991

INVENTOR(S) : George Potsch

It is certified that error appears in the above-identified patent and that said Letters Patent is hereby corrected as shown below:

At column 1, line 13, "two" should read --tow--.

At column 1, line 39, "Pat. No." should read --Pat. Nos.--.

At column 1, line 61, "two" should read --tow--.

At column 2, line 3, "two" should read --tow--.

At column 2, line 18, "tailer" should read --trailer--.

At column 2, line 42, "includes;" should read --includes:--.

At column 2, line 58, "trail" should read --trailer--.

At column 3, line 55, "embodiments" should read --embodiment--.

At column 4, line 55, "along" should read --alone--.

At column 5, line 12, "mechanism" should read --mechanisms--.

At column 5, line 50, after the word "less", please insert --spalling--.

At column 5, line 51, please delete the word --spalling--.

At column 5, line 66, "coupled" should read --coupler--.

At column 5, line 68, "the body" should read --slide body--.

UNITED STATES PATENT AND TRADEMARK OFFICE
CERTIFICATE OF CORRECTION

PATENT NO. : 4,991,864

DATED : February 12, 1991

INVENTOR(S) : George Potsch

It is certified that error appears in the above-identified patent and that said Letters Patent is hereby corrected as shown below:

At column 6, line 26, "slidably" should read --slidability--.

At column 6, line 28, "6A" should read --6--.

At column 6, line 34, "busing" should read --bushing--.

At column 6, line 46, "3B" should read --2B--.

At column 6, line 47, "busing" should read --bushing--.

At column 6, line 50, "fount" should read --found--.

At column 7, line 54, "characters" should read --character--.

At column 8, line 26, "and" should read --said--.

At column 9, line 7, "mans" should read --means--.

At column 10, line 36, "and" should read --said--.

At column 11, line 1, "mans" should read --means--.

At column 11, line 19, "enhancing" should read --enhance--.

At column 11, line 34, "or" should read --of--.

At column 12, line 35, "housing" should read --housings--.

UNITED STATES PATENT AND TRADEMARK OFFICE
CERTIFICATE OF CORRECTION

PATENT NO. : 4,991,864

DATED : February 12, 1991

INVENTOR(S) : George Potsch

It is certified that error appears in the above-identified patent and that said Letters Patent is hereby corrected as shown below:

At column 12, line 60, "both;" should read --both:--.

At column 12, line 65, "will" should read --well--.

At column 13, line 9, "(b)" should read --(a)--.

At column 13, line 14, following the words "member to" please insert the word --the--.

At column 14, line 11, following the words "of said" please insert the word --slide--.

Signed and Sealed this

Seventh Day of July, 1992

Attest:

DOUGLAS B. COMER

*Attesting Officer*  *Acting Commissioner of Patents and Trademarks*